(12) United States Patent
Rajagopalan et al.

(10) Patent No.: US 12,730,626 B2
(45) Date of Patent: Sep. 8, 2026

(54) UPDATING FIRMWARE OF A COMPUTING PERIPHERAL AT A DOCKING STATION

(71) Applicant: Dell Products L.P., Round Rock, TX (US)

(72) Inventors: Srinivasa Ragavan Rajagopalan, Bangalore (IN); Jyothi Bandakka Nanjappa, Bangalore (IN); Gokul Thiruchengode Vajravel, Bangalore (IN); Mariappan Nachiappan, TamilNadu (IN)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 18/663,459

(22) Filed: May 14, 2024

(65) Prior Publication Data

US 2025/0355657 A1 Nov. 20, 2025

(51) Int. Cl.
*G06F 8/65* (2018.01)
*G06F 1/16* (2006.01)

(52) U.S. Cl.
CPC .............. *G06F 8/65* (2013.01); *G06F 1/1632* (2013.01)

(58) Field of Classification Search
CPC ................................. G06F 1/1632; G06F 8/65
See application file for complete search history.

(56) References Cited

U.S. PATENT DOCUMENTS

2006/0253638 A1* 11/2006 Oliver .................... G06F 1/1632 710/303
2014/0317611 A1* 10/2014 Wojcik .................... G06F 8/654 717/168
2017/0024197 A1* 1/2017 Pentelka ............. G06F 9/44505
2023/0077706 A1* 3/2023 Tsang .................... H04L 9/0891 710/303

FOREIGN PATENT DOCUMENTS

WO WO-2022046084 A1 * 3/2022 ............... G06F 8/65

OTHER PUBLICATIONS

Monitor From Window function (winuser.h) (https://learn.microsoft.com/en-us/windows/win32/api/winuser/nf-winuser-monitorfromwindow, Oct. 12, 2021); 3 pages.

* cited by examiner

*Primary Examiner* — Phillip H Nguyen
(74) *Attorney, Agent, or Firm* — McDermott Will & Schulte LLP

(57) ABSTRACT

Updating a computing peripheral, including identifying, at an external computing device, a firmware update package associated with a particular computing peripheral; providing, by the external computing device and to a docking station communicatively coupled to the external computing device, the firmware update package; in response to receiving the firmware update package at the docking station: requesting, by the docking station and to an information handling system communicatively coupled to the docking station, context of the information handling system; determining, by the docking station and based on the context, that (Continued)

the particular computing peripheral is available for updating; in response to determining that the particular computing peripheral is available for updating, determining, by the docking station, that resources of the docking station are available; and in response to determining that resources of the docking station are available, applying, by the docking station, the firmware update package at the particular computing peripheral.

20 Claims, 7 Drawing Sheets

UPDATING FIRMWARE OF A COMPUTING PERIPHERAL AT A DOCKING STATION

BACKGROUND

Field of the Disclosure

The disclosure relates generally to updating firmware of a computing peripheral at a docking station.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A docking station is a peripheral device that allows a laptop or portable computer to connect to various external peripherals and accessories. It serves as a central hub, providing additional ports and functionality beyond what the laptop itself offers. Docking stations are commonly used in office environments, where users can quickly connect their laptops to a larger monitor, keyboard, mouse, and other devices. Docking stations typically include a variety of ports, such as USB, HDMI, DisplayPort, Ethernet, audio jacks, and power connectors. These ports allow users to connect external monitors, printers, external hard drives, and other peripherals without the hassle of plugging and unplugging individual cables each time.

SUMMARY

Innovative aspects of the subject matter described in this specification may be embodied in a method of updating a computing peripheral, including identifying, at an external computing device, a firmware update package associated with a particular computing peripheral; providing, by the external computing device and to a docking station communicatively coupled to the external computing device, the firmware update package; in response to receiving the firmware update package at the docking station: requesting, by the docking station and to an information handling system communicatively coupled to the docking station, context of the information handling system, the context including a current usage of the particular computing peripheral; determining, by the docking station and based on the context, that the particular computing peripheral is available for updating; in response to determining that the particular computing peripheral is available for updating, determining, by the docking station, that resources of the docking station are available; and in response to determining that resources of the docking station are available, applying, by the docking station, the firmware update package at the particular computing peripheral.

Other embodiments of these aspects include corresponding systems, apparatus, and computer programs, configured to perform the actions of the methods, encoded on computer storage devices.

These and other embodiments may each optionally include one or more of the following features. For instance, determining, by the docking station, that the particular computing peripheral is coupled to the docking station; and in response to determining that the particular computing peripheral is coupled to the docking station, requesting the context of the information handling system. Determining, by the docking station, that the particular computing peripheral is coupled to the information handling system; in response to determining that the particular computing peripheral is coupled to the information handling system, applying, by the information handling system, the firmware update package at the particular computing peripheral. Providing, by the information handling system and to the docking station, the context of the information handling system in response to the request; and receiving, by the docking station and from the information handling system, the context of the information handling system. Determining that the particular computing peripheral is available for update includes determining that the particular computing peripheral is not currently in use. Determining, by the docking station and based on the context, that the particular computing peripheral is unavailable for updating; and in response to determining that the particular computing peripheral is unavailable for updating, determining, by the docking station, a later time at which the particular computing peripheral is available for updating. Determining the later time at which the particular computing peripheral is available for updating includes determining when the particular computing peripheral is not currently in use. Determining, by the docking station, that resources of the docking station are unavailable; and in response to determining that resources of the docking station are unavailable, transferring, by the docking station and to the information handling system, the firmware update package. Receiving, by the information handling system, the firmware update package; and applying, by the information handling system, the firmware update package at the particular computing peripheral.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
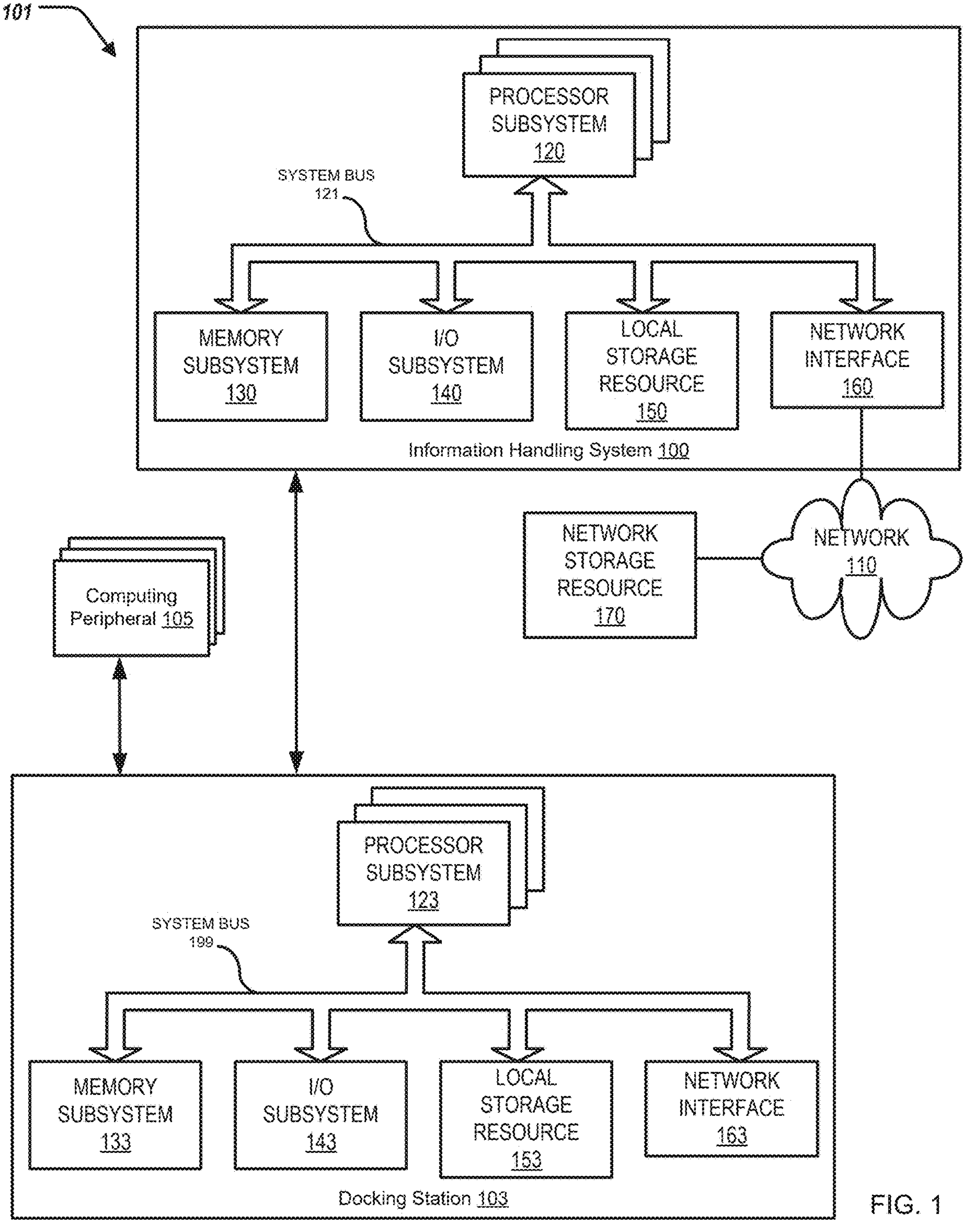
FIG. 1 is a block diagram of selected elements of an embodiment of an information handling system.

This disclosure discusses methods and systems for updating firmware of a computing peripheral. In short, computing peripherals may need to be updated (e.g., BIOS, OS, apps). To that end, the computing peripherals can be updated while connected to a docking station with minimal and/or no interruption to normal use. The computing peripherals can be updated by the docking station (when the docking station has available resources) and in a coordinated way based on context of an information handling system, described further herein.

Specifically, this disclosure discusses a system and a method for updating a computing peripheral, including identifying, at an external computing device, a firmware update package associated with a particular computing peripheral; providing, by the external computing device and to a docking station communicatively coupled to the external computing device, the firmware update package; in response to receiving the firmware update package at the docking station: requesting, by the docking station and to an information handling system communicatively coupled to the docking station, context of the information handling system, the context including a current usage of the particular computing peripheral; determining, by the docking station and based on the context, that the particular computing peripheral is available for updating; in response to determining that the particular computing peripheral is available for updating, determining, by the docking station, that resources of the docking station are available; and in response to determining that resources of the docking station are available, applying, by the docking station, the firmware update package at the particular computing peripheral.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices, as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of a computing environment 101 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system 100). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The environment 101 can further include a docking station 103 (or a "smart" docking station). The docking station 103 can be coupled to the information handling system 101—that is, the information handling system 101 can be physically coupled to the docking station 103 as well as communicatively coupled to the docking station 103. One or more peripherals 105 can be coupled (physically and communicatively) to the docking station 103. In short, the docking station 103 facilitates connection between the information handling system 101 and the peripherals 105 acting as a central hub to stream connectively and productivity of the information handling system 101. The peripherals 105 can include external displays, keyboards, mice, wired Ethernet, backup hard drives, printers, and the like.

The docking station 103 can include a processor subsystem 123, a memory subsystem 133, an I/O subsystem 143, a local storage resource 153, a network interface 163, and a system bus 199. The processor subsystem 123, the memory subsystem 133, the I/O subsystem 143, the local storage resource 153, the network interface 163, and the system bus 199 can be similar to (similar functionality) the processor subsystem 120, the memory subsystem 130, the I/O subsystem 140, the local storage resource 150, the network interface 160, and the system bus 121 of the information handling system 100.

Figure 2:
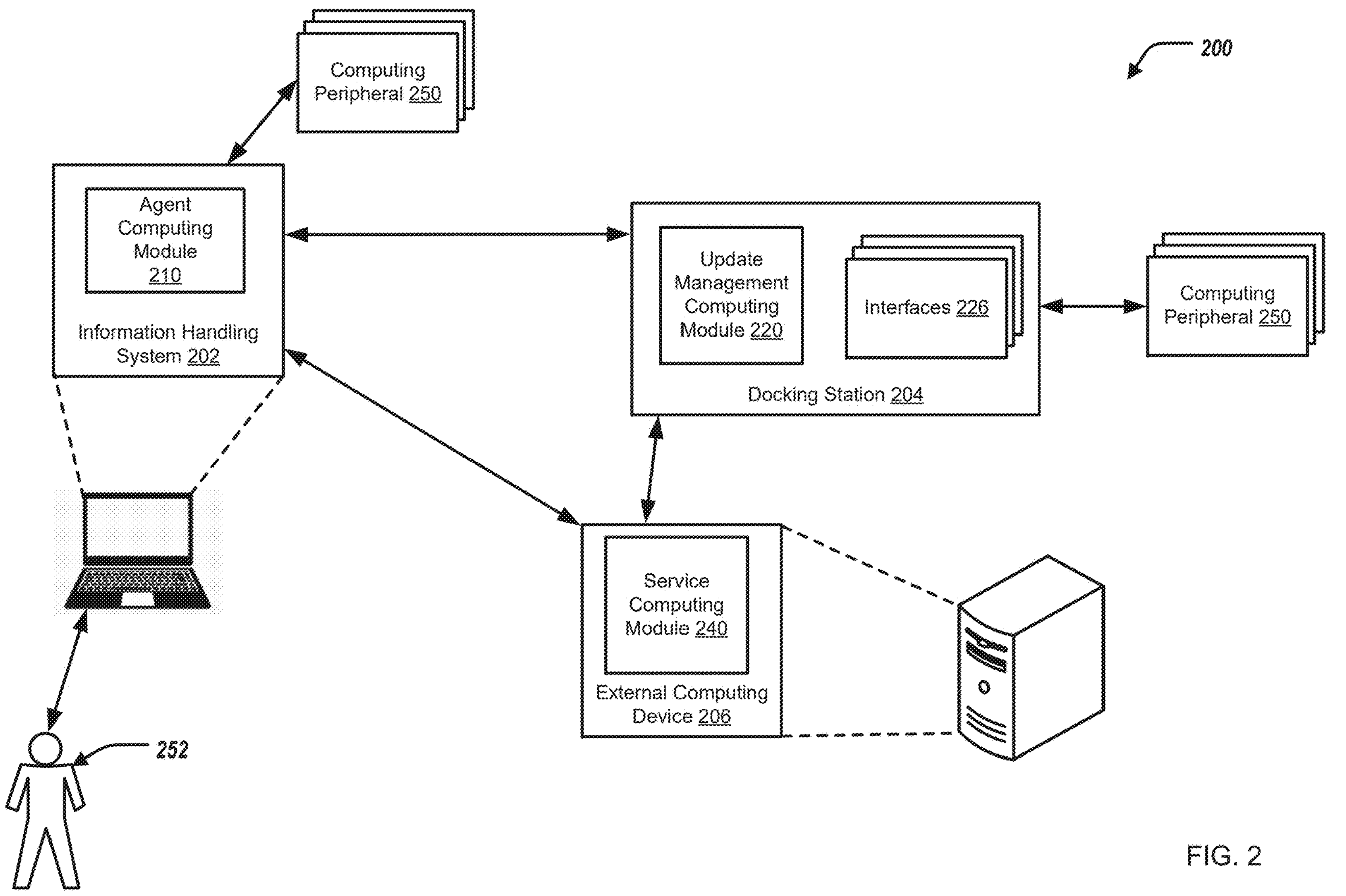
FIG. 2 illustrates a block diagram of an information handling system for updating firmware of a computing peripheral.

Turning to FIG. 2, FIG. 2 illustrates an environment 200 including an information handling system 202, a docking station 204, and an external computing device 206. The information handling system 202 can include an agent computing module 210. In some examples, the information handling system 202 is similar to, or includes, the information handling system 100 of FIG. 1.

The docking station 204 can include an update management computing module 220. The docking station 204 can further include interfaces 226. The interfaces 226 can include such interfaces as HDMI, BT, DP, and wireless. In some examples, the docking station 204 is similar to, or includes, the docking station 103 of FIG. 1.

The external computing device 206 can include a service computing module 240. The external computing device 206 can be a cloud-based computing device (or cloud-based server). The external computing device 206 can include one or more computing devices/computing servers.

The information handling system 202 can be in communication with the docking station 204. That is, the information handling system 202 can be physically and communicably coupled with the docking station 204. In some examples, the information handling system 202 is in communication with the docking station 204 over a stateless out-of-band (OOB) channel. The information handling system 202 can further be in communication with the external computing device 206, e.g., over a network (the Internet).

The docking station 204 can be in communication with the information handling system 202. That is, the docking station 204 can be physically and communicably coupled with the information handling system 202. The docking station 204 can further be in communication with the external computing device 206, e.g., over a network (the Internet).

The external computing device 206 can be in communication with the information handling system 202 and the docking station 204, e.g., over a network (the Internet).

One or more computing peripherals 250 (or peripheral devices 250, or devices 250) can be coupled to the docking station 204. The computing peripherals 250 can be similar to, or include, the computing peripherals 105 of FIG. 1.

In short, the computing peripherals 250 may need to be updated (e.g., BIOS, OS, apps). To that end, the computing peripherals 250 can be updated while connected to the docking station 204 with minimal and/or no interruption to normal use. The computing peripherals 250 can be updated by the docking station 204 (when the docking station 204 has available resources) and in a coordinated way based on context of the information handling system 202, described further below.

Figure 3A:
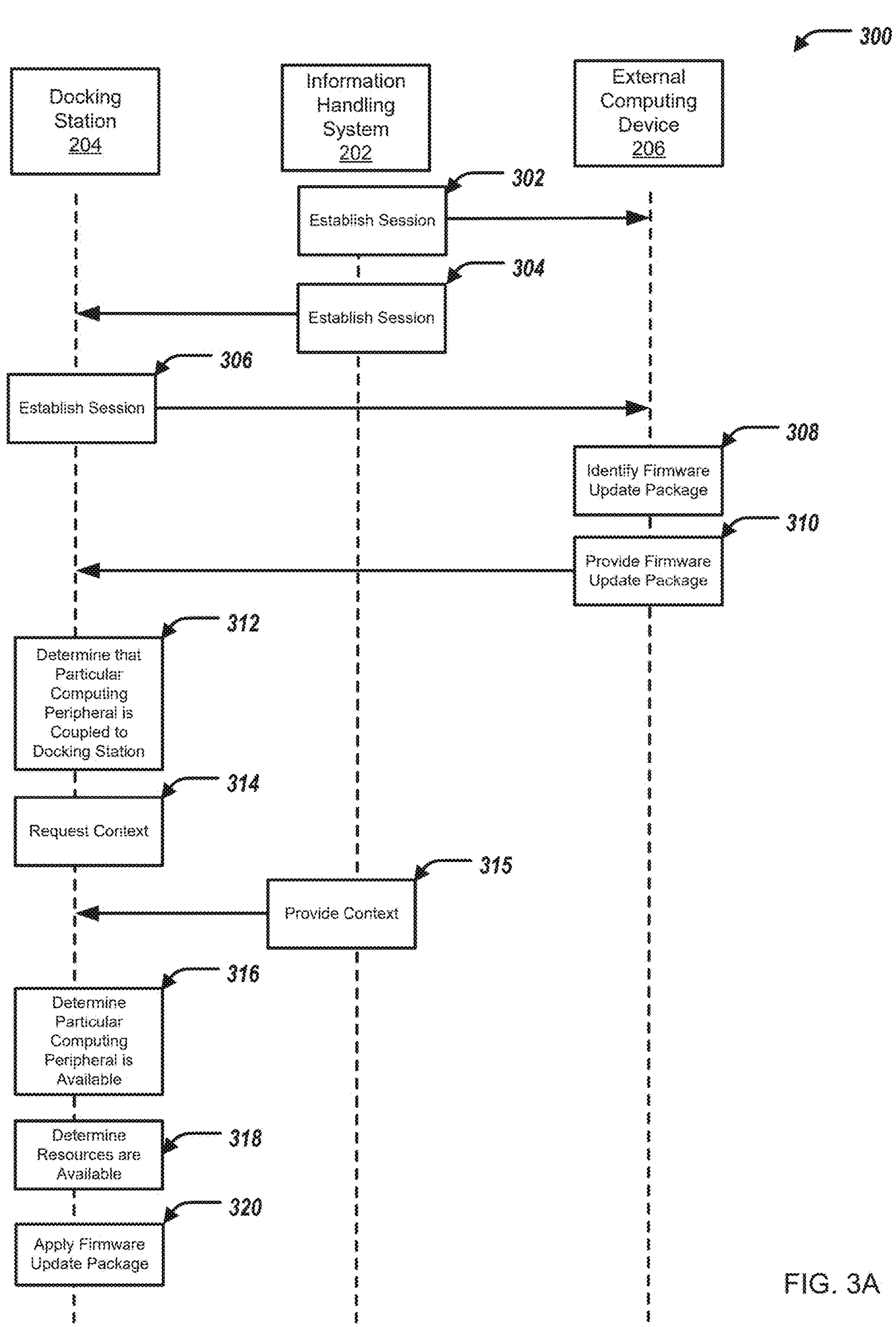
FIGS. 3A-3D illustrate respective swim-lane diagrams for updating firmware of a computing peripheral.

FIG. 3A illustrates a swim-lane diagram depicting selected elements of an embodiment of a method 300 for updating firmware of a computing peripheral. The method 300 may be performed by the information handling system 100, the docking station 103, the information handling system 202, the docking station 204, and/or the external computing device 206, and with reference to FIGS. 1-2. It is noted that certain operations described in method 300 may be optional or may be rearranged in different embodiments.

The information handling system 202 establishes a connection with the external computing device 206, at 302. Specifically, the agent computing module 210 of the information handling system 202 establishes the connection (communication connection) with the external computing device 206.

The information handling system 202 establishes a connection with the docking station 204, at 304. Specifically, the agent computing module 210 of the information handling system 202 establishes a connection (communication connection) with the docking station 204. In other words, a coupling is established between the information handling system 202 and the docking station 204.

The docking station 204 establishes a connection with the external computing device 206, at 306. Specifically, the update management computing module 220 establishes a connection with the external computing device 206.

The external computing device 206 identifies a firmware update package associated with a particular computing peripheral 250, at 308. Specifically, the service computing module 240 of the external computing device 206 identifies the firmware update package (e.g., over the Internet). The external computing device 206 provides to the docking station 204 the firmware update package, at 310. Specifically, the service computing module 240 of the external computing device 206 provides the firmware update package to the docking station 204. The docking station 204 receives the firmware update package.

The docking station 204, in response to receiving the firmware update package, determines that the particular computing peripheral 250 is coupled to the docking station 204, at 312. Specifically, the update management computing module 220 of the docking station 204 determines that the particular computing peripheral 250 is coupled to the docking station 204. The docking station 204 can determine that the particular computing peripheral 250 is coupled to the docking station 204 through a particular interface 226. That is, the particular computing peripheral 250 is coupled to the docking station 204 such that the particular computing peripheral 250 communicates with the docking station 204 through the particular interface 226.

The docking station 204 requests, from the information handling system 202, context of the information handling system 202, at 314. Specifically, the update management computing module 220 of the docking station 204 requests, from the information handling system 202, context of the information handling system 202. That is, the docking station 204 requests the context from the information handling system 202 such as details of the informant handling system 202 and correlates such with the usage of the particular computing peripheral 250. For example, the docking station 204 can request context from the information handling system 202 including which specific computer-implemented applications are currently executing ("running") at the information handling system 202, which computer-implemented services are currently executing ("running") at the information handling system 202, and which computing peripherals 250 are being access/utilized by the computer-implemented applications and the computer-implemented services of the information handling system 202.

In some examples, the context requested by the docking station 204 of the information handling system 202 can include a current usage of the particular computing peripheral 250. For example, the computing peripherals 250 can include a first monitor and a second monitor (dual-monitors). The context of the information handling system 202 can indicate that only one of the monitors is being utilized at a time (e.g., by the computer-implemented applications of the information handling system 202). In other words, the context of the information handling system 202 can indicate that the particular computing peripheral 250 (the second monitor) is not currently being used.

In some examples, the docking station 204, in response to determining that the particular computing peripheral 250 is coupled to the docking station 204, requests the context from the information handling system 202. That is, only when the particular computing peripheral 250 is coupled to the docking station 204 does the docking station 204 request the context information from the information handling system 202.

The information handling system 202 provides, to the docking station 204, the context of the information handling system 202 in response to the request, at 315. Specifically, the agent computing module 210 of the information handling system 202 provides, to the docking station 204, the context of the information handling system 202 in response to the request. The docking station 204 receives, from the information handling system 202, the context.

The docking station 204 determines, based on the context, that the particular computing peripheral 250 is available for updating, at 316. Specifically, the update management computing module 220 of the docking station 204 determines, based on the context, that the particular computing peripheral 250 is available for updating. In some examples, the docking station 204 determines that the particular computing peripheral 250 is available for updating by determining that the particular computing peripheral 250 is not currently in use. For example, the context of the information handling system 202 can indicate that only one of the monitors is being utilized at a time (e.g., by the computer-implemented applications of the information handling system 202). In other words, the context of the information handling system 202 can indicate that the particular computing peripheral 250 (the second monitor) is not currently being used. Thus, the docking station 204, based on the context, determines that the particular computing peripheral 250 (the second monitor) is available for updating as the particular computing peripheral 250 (the second monitor) is not currently in use.

The docking station 204, in response to determining that the particular computing peripheral 250 is available for updating, determines that (computational) resources of the docking station 204 are available, at 318. Specifically, the update management computing module 220 of the docking station 204 determines that the (computational) resources of the docking station 204 are available. That is, the docking station 204 assesses the resource availability of the docking station 204, including, assessing availability of the CPU of the docking station 204 (CPU bandwidth) and assessing availability of memory of the docking station 204 (memory bandwidth).

The docking station 204, in response to determining that the resources of the docking station 204 are available, applies the firmware update package at the particular computing peripheral 250, at 320. Specifically, the update management computing module 220 of the docking station 204 applies the firmware update package at the particular computing peripheral 250. For example, the docking station 204 applies the firmware update package to the second monitor.

Figure 3B:
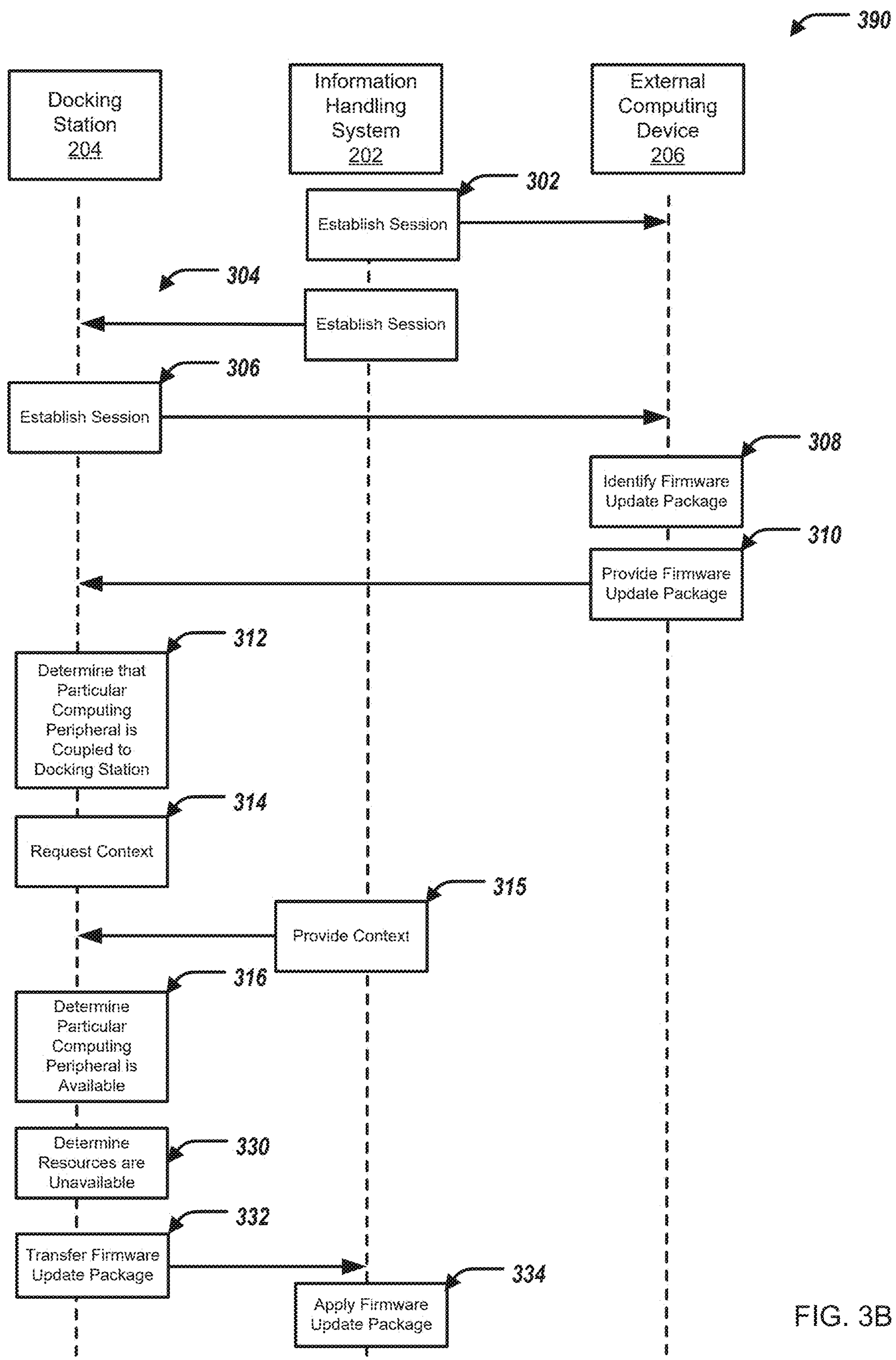

FIG. 3B illustrates a swim-lane diagram depicting selected elements of an embodiment of a method 390 for updating firmware of a computing peripheral. The method 390 may be performed by the information handling system 100, the docking station 103, the information handling system 202, the docking station 204, and/or the external computing device 206, and with reference to FIGS. 1-2. It is noted that certain operations described in method 390 may be optional or may be rearranged in different embodiments.

Steps 302-316 are similar to that of FIG. 3A.

The docking station 204, in response to determining that the particular computing peripheral 250 is available for updating, determines that (computational) resources of the docking station 204 are unavailable, at 330. Specifically, the update management computing module 220 of the docking station 204 determines that the (computational) resources of the docking station 204 are unavailable. That is, the docking station 204 assesses the resource availability of the docking station 204, including, assessing availability of the CPU of the docking station 204 (CPU bandwidth) and assessing availability of memory of the docking station 204 (memory bandwidth).

The docking station 204, in response to determining that the resources of the docking station 204 are unavailable, transfers the firmware update package to the information handling system 202, at 332. Specifically, the update management computing module 220 of the docking station 204 transfers the firmware update package to the information handling system 202. That is, the docking station 204 will act as a simple/transparent bridge between the information handling system 202 and the particular computing peripheral 250.

The information handling system 202 receives the firmware update package. The information handling system 202 applies the firmware update package at the particular computing peripheral 250, at 334. Specifically, the agent computing module 210 of the information handling system 202 applies the firmware update package at the particular computing peripheral 250. For example, the information handling system 202 applies the firmware update package to the second monitor.

Figure 3C:
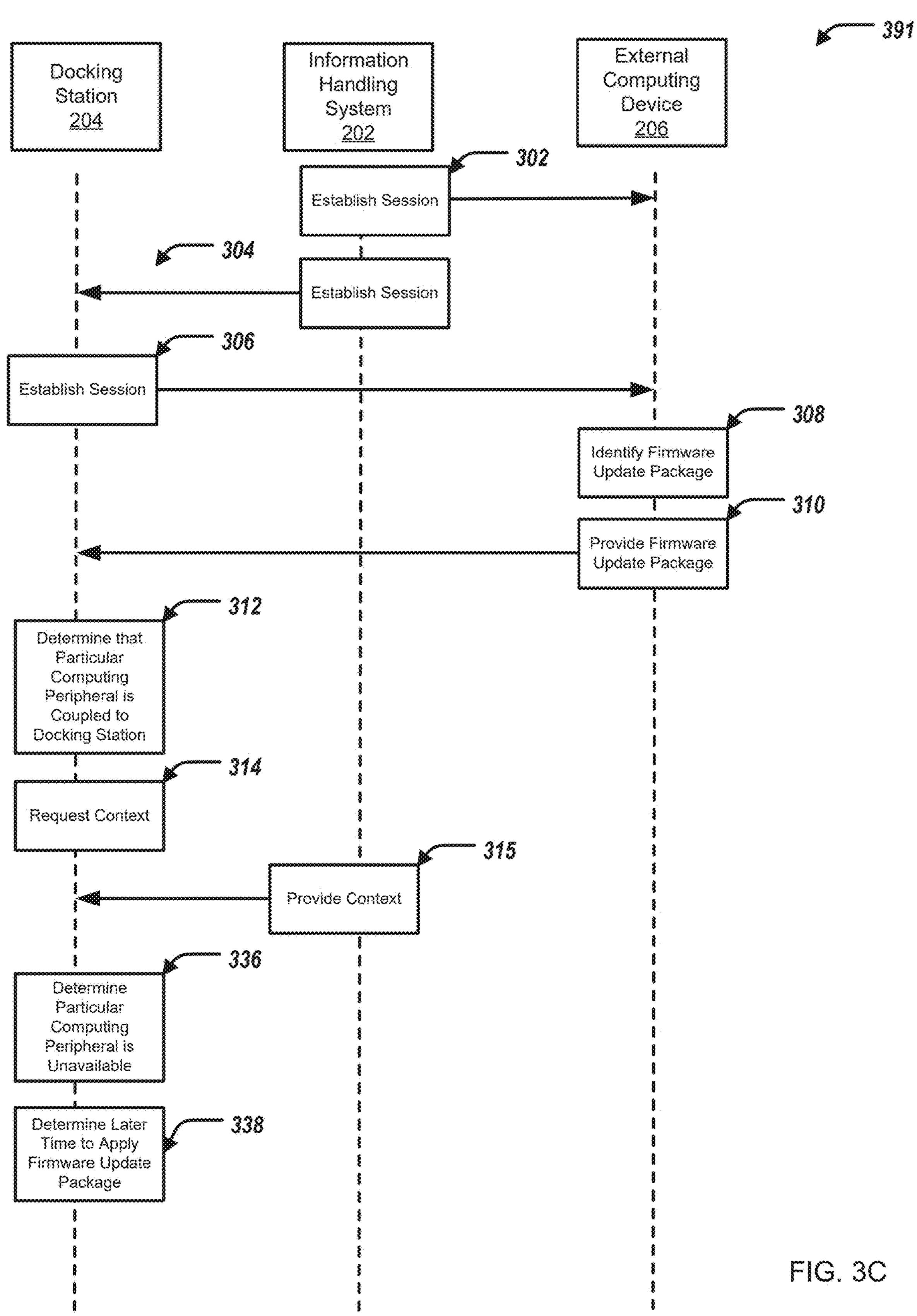

FIG. 3C illustrates a swim-lane diagram depicting selected elements of an embodiment of a method 391 for updating firmware of a computing peripheral. The method 391 may be performed by the information handling system 100, the docking station 103, the information handling system 202, the docking station 204, and/or the external computing device 206, and with reference to FIGS. 1-2. It is noted that certain operations described in method 391 may be optional or may be rearranged in different embodiments.

Steps 302-315 are similar to that of FIG. 3A.

The docking station 204 determines, based on the context information, that the particular computing peripheral 250 is unavailable for updating, at 336. Specifically, the update management computing module 220 of the docking station 204 determines, based on the context information, that the particular computing peripheral 250 is unavailable for updating. In some examples, the docking station 204 determines that the particular computing peripheral 250 is unavailable for updating by determining that the particular computing peripheral 250 is currently in use. For example, the context of the information handling system 202 can indicate that both of the monitors are being utilized at a time (e.g., by the computer-implemented applications of the information handling system 202). In other words, the context of the information handling system 202 can indicate that the particular computing peripheral 250 (the second monitor) is currently being used. Thus, the docking station 204, based on the context, determines that the particular computing peripheral 250 (the second monitor) is unavailable for updating as the particular computing peripheral 250 (the second monitor) is currently in use.

The docking station 204, in response to determining that the particular computing peripheral 250 is unavailable for updating, determines a later time at which the particular computing peripheral 250 is available for updating, at 338. Specifically, the update management computing module 220 of the docking station 204 determines the later time at which the particular computing peripheral 250 is available for updating. In some examples, the docking station 204 determines the later time at which the particular computing peripheral 250 is available for updating based on the context information. That is, the docking station 204 determines the later time at which the particular computing peripheral 250 is available for updating by determining when the particular computing peripheral 250 will not be in use. For example, the context of the information handling system 202 can indicate that only one of the monitors is being utilized at a time in the future (e.g., by the computer-implemented applications of the information handling system 202). In other words, the context of the information handling system 202 can indicate that the particular computing peripheral 250 (the second monitor) will not be in use at a predetermined time in the future. Thus, the docking station 204, based on the context, determines that the particular computing peripheral 250 (the second monitor) is available for updating at the later time in the future as the particular computing peripheral 250 (the second monitor) will not be in use.

In some examples, in response to determining that the particular computing peripheral 250 is unavailable for updating, the external computing device 206 can determine the later time at which the particular computing peripheral 250 is available for updating utilizing machine learning (ML). Specifically, the external computing device 206 can receive input from the docking station 204 indicating that the particular computing peripheral 250 is unavailable for updating, and further receive the context (either from the docking station 204 and/or the information handling system 202). The external computing device 206, and in particular, the service computing module 240, can determine the later time at which the particular computing peripheral 250 is available for updating utilizing ML and/or neural networks. For example, the context can indicate user-attention of the user 252 via human precedence detection (HPD), resources of the docking station 204, and upcoming tasks of the user 252, as indicated by software of the information handling system 202 (such as calendar obligations). The external computing device 206 can provide data indicating the later time at which the particular computing peripheral 250 is available to update to the docking station 204.

Figure 3D:
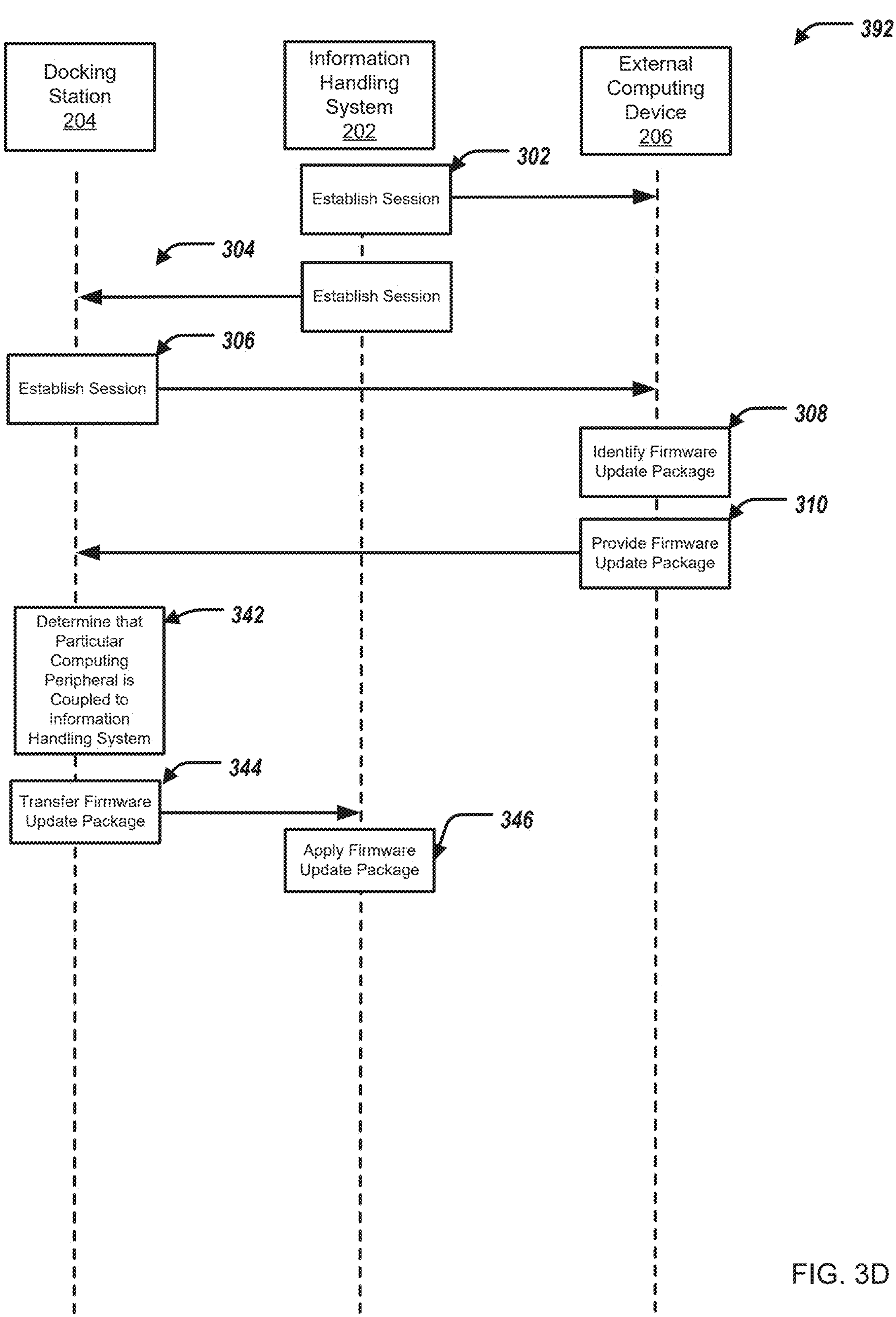

FIG. 3D illustrates a swim-lane diagram depicting selected elements of an embodiment of a method 392 for updating firmware of a computing peripheral. The method 392 may be performed by the information handling system 100, the docking station 103, the information handling system 202, the docking station 204, and/or the external computing device 206, and with reference to FIGS. 1-2. It is noted that certain operations described in method 392 may be optional or may be rearranged in different embodiments.

Steps 302-310 are similar to that of FIG. 3A.

The docking station 204, in response to receiving the firmware update package, determines that the particular computing peripheral 250 is coupled to the information handling system 202, at 342. Specifically, the update management computing module 220 of the docking station 204 determines that the particular computing peripheral 250 is coupled to the information handling system 202.

The docking station 204, in response to determining that the particular computing peripheral 250 is coupled to the information handling system 202, transfers the firmware update package to the information handling system 202, at 344. Specifically, the update management computing module 220 of the docking station 204 transfers the firmware update package to the information handling system 202. That is, the docking station 204 will act as a simple/transparent bridge between the information handling system 202 and the particular computing peripheral 250.

The information handling system 202 receives the firmware update package. The information handling system 202 applies the firmware update package at the particular computing peripheral 250, at 346. Specifically, the agent computing module 210 of the information handling system 202 applies the firmware update package at the particular computing peripheral 250. For example, the information handling system 202 applies the firmware update package to the second monitor.

Figure 4:
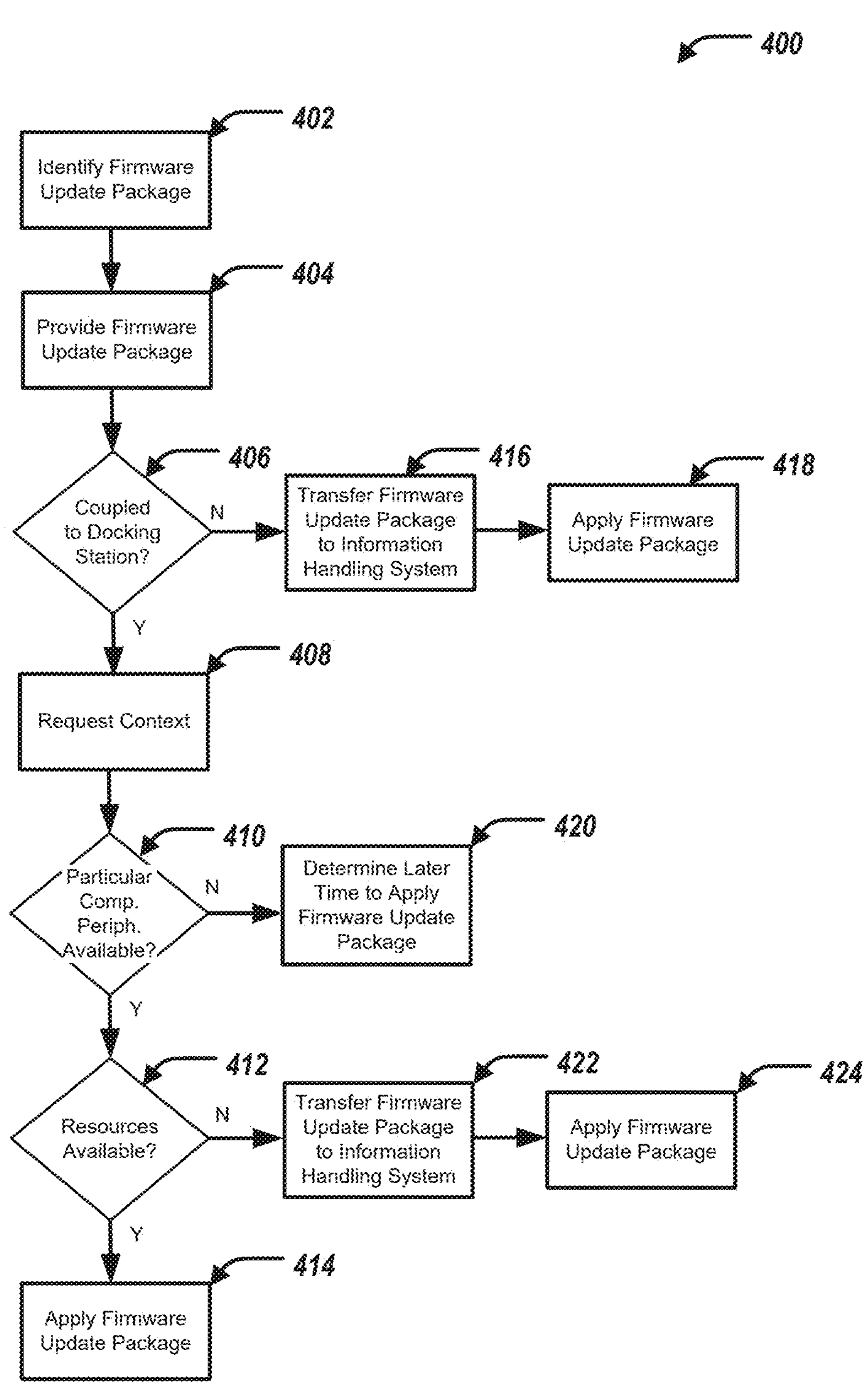
FIG. 4 illustrates a method for updating firmware of a computing peripheral.

FIG. 4 illustrates a flowchart depicting selected elements of an embodiment of a method 300 for updating firmware of a computing peripheral. The method 400 may be performed by the information handling system 100, the docking station 103, the information handling system 202, the docking station 204, and/or the external computing device 206, and with reference to FIGS. 1-2. It is noted that certain operations described in method 400 may be optional or may be rearranged in different embodiments.

The external computing device 206 identifies a firmware update package associated with a particular computing peripheral 250, at 402. The external computing device 206 provides to the docking station 204 the firmware update package, at 404. The docking station 204 determines the particular computing peripheral 250 is coupled to the docking station 204, at 406. When the docking station 204 determines that the particular computing peripheral 250 is coupled to the docking station 204, the docking station 204 requests, from the information handling system 202, context of the information handling system 202, at 408. The docking station 204 determines whether the particular computing peripheral 250 is available, at 410. When the docking station 204 determines that the particular computing peripheral 250 is available, the docking station 204 determines whether resources at the docking station 204 are available, at 412. When the docking station 204 determines there are resources available at the docking station 204, the docking station 204 applies the firmware update package at the particular computing peripheral 250, at 414.

When the docking station 204 determines that the particular computing peripheral 250 is not coupled to the docking station 204 and coupled to the information handling system 202 (at 406), the docking station 204 transfers the firmware update package to the information handling system 202, at 416. The information handling system 202 applies the firmware update package at the particular computing peripheral 250, at 418.

When the docking station 204 determines that the particular computing peripheral 250 is unavailable (at 410), the docking station 204, in response to determining that the particular computing peripheral 250 is unavailable for updating, determines a later time at which the particular computing peripheral is available for updating, at 420.

When the docking station 204 determines that the resources are unavailable at the docking station 204 (at 412), the docking station 204 transfers the firmware update package to the information handling system 202, at 422. The information handling system 202 applies the firmware update package at the particular computing peripheral 250, at 424.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of updating a computing peripheral, including:

identifying, at an external computing device, a firmware update package associated with a particular computing peripheral;

providing, by the external computing device and to a docking station communicatively coupled to the external computing device, the firmware update package;

in response to receiving the firmware update package at the docking station:

requesting, by the docking station and to an information handling system communicatively coupled to the docking station, context of the information handling system, the context including a current usage of the particular computing peripheral;

determining, by the docking station and based on the context, that the particular computing peripheral is available for updating;

in response to determining that the particular computing peripheral is available for updating, determining, by the docking station, that resources of the docking station are available; and in response to determining that resources of the docking station are available, applying, by the docking station, the firmware update package at the particular computing peripheral.

2. The computer-implemented method of claim 1, further including:

determining, by the docking station, that the particular computing peripheral is coupled to the docking station; and in response to determining that the particular computing peripheral is coupled to the docking station, requesting the context of the information handling system.

3. The computer-implemented method of claim 1, further including:

determining, by the docking station, that the particular computing peripheral is coupled to the information handling system;

in response to determining that the particular computing peripheral is coupled to the information handling system, applying, by the information handling system, the firmware update package at the particular computing peripheral.

4. The computer-implemented method of claim 1, further including:

providing, by the information handling system and to the docking station, the context of the information handling system in response to the request; and receiving, by the docking station and from the information handling system, the context of the information handling system.

5. The computer-implemented method of claim 1, wherein determining that the particular computing peripheral is available for update includes determining that the particular computing peripheral is not currently in use.

6. The computer-implemented method of claim 1, further including:

determining, by the docking station and based on the context, that the particular computing peripheral is unavailable for updating; and in response to determining that the particular computing peripheral is unavailable for updating, determining, by the docking station, a later time at which the particular computing peripheral is available for updating.

7. The computer-implemented method of claim 6, wherein determining the later time at which the particular computing peripheral is available for updating includes determining when the particular computing peripheral is not currently in use.

8. The computer-implemented method of claim 1, further including:

determining, by the docking station, that resources of the docking station are unavailable; and in response to determining that resources of the docking station are unavailable, transferring, by the docking station and to the information handling system, the firmware update package.

9. The computer-implemented method of claim 8, further including:

receiving, by the information handling system, the firmware update package; and applying, by the information handling system, the firmware update package at the particular computing peripheral.

10. A computing environment, including:

an information handling system comprising a first processor having access to memory media storing instructions executable by the first processor to perform operations;

a plurality of peripheral devices;

a docking station connected to the plurality of peripheral devices and the information handling system, the docking station comprising a second processor having access to memory media storing instructions executable by the second processor to perform operations;

an external computing device in communication with the docking station and the information handling system, the external computing device comprising a third processor having access to memory media storing instructions executable by the third processor to perform operations, comprising:

identifying a firmware update package associated with a particular computing peripheral;

providing, to the docking station, the firmware update package;

wherein the docking station is configured to perform operations:

requesting, to the information handling system, context of the information handling system, the context including a current usage of the particular computing peripheral;

determining, based on the context, that the particular computing peripheral is available for updating;

in response to determining that the particular computing peripheral is available for updating, determining that resources of the docking station are available; and in response to determining that resources of the docking station are available, applying the firmware update package at the particular computing peripheral.

11. The computing environment of claim 10, wherein the docking station is configured to perform operations:

determining that the particular computing peripheral is coupled to the docking station; and in response to determining that the particular computing peripheral is coupled to the docking station, requesting the context of the information handling system.

12. The computing environment of claim 10, wherein the docking station is configured to perform operations:

determining that the particular computing peripheral is coupled to the information handling system;

wherein the information handling system is configured to perform operations:

in response to determining that the particular computing peripheral is coupled to the information handling system, applying the firmware update package at the particular computing peripheral.

13. The computing environment of claim 10, wherein the information handling system is configured to perform operations:

providing, to the docking station, the context of the information handling system in response to the request;

wherein the docking station is configured to perform operations:

receiving, by the information handling system, the context of the information handling system.

14. The computing environment of claim 10, wherein determining that the particular computing peripheral is available for update includes determining that the particular computing peripheral is not currently in use.

15. The computing environment of claim 10, wherein the docking station is configured to perform operations:

determining, based on the context, that the particular computing peripheral is unavailable for updating; and in response to determining that the particular computing peripheral is unavailable for updating, determining a later time at which the particular computing peripheral is available for updating.

16. The computing environment of claim 15, wherein determining the later time at which the particular computing peripheral is available for updating includes determining when the particular computing peripheral is not currently in use.

17. The computing environment of claim 10, wherein the docking station is configured to perform operations:

determining that resources of the docking station are unavailable; and in response to determining that resources of the docking station are unavailable, transferring, to the information handling system, the firmware update package.

18. The computing environment of claim 17, wherein the information handling system is configured to perform operations:

receiving the firmware update package; and applying the firmware update package at the particular computing peripheral.

19. A non-transitory computer-readable medium storing software comprising instructions executable by one or more computers which, upon such execution, cause the one or more computers to perform operations comprising:

identifying, at an external computing device, a firmware update package associated with a particular computing peripheral;

providing, by the external computing device and to a docking station communicatively coupled to the external computing device, the firmware update package;

in response to receiving the firmware update package at the docking station:

requesting, by the docking station and to an information handling system communicatively coupled to the docking station, context of the information handling system, the context including a current usage of the particular computing peripheral;

determining, by the docking station and based on the context, that the particular computing peripheral is available for updating;

in response to determining that the particular computing peripheral is available for updating, determining, by the docking station, that resources of the docking station are available; and in response to determining that resources of the docking station are available, applying, by the docking station, the firmware update package at the particular computing peripheral.

20. The non-transitory computer-readable medium of claim 19, the operations further including:

determining, by the docking station, that the particular computing peripheral is coupled to the docking station; and in response to determining that the particular computing peripheral is coupled to the docking station, requesting the context of the information handling system.

* * * * *